L. F. N. BALDWIN.
VEHICLE TIRE.
APPLICATION FILED NOV. 25, 1911.
1,196,069. Patented Aug. 29, 1916.
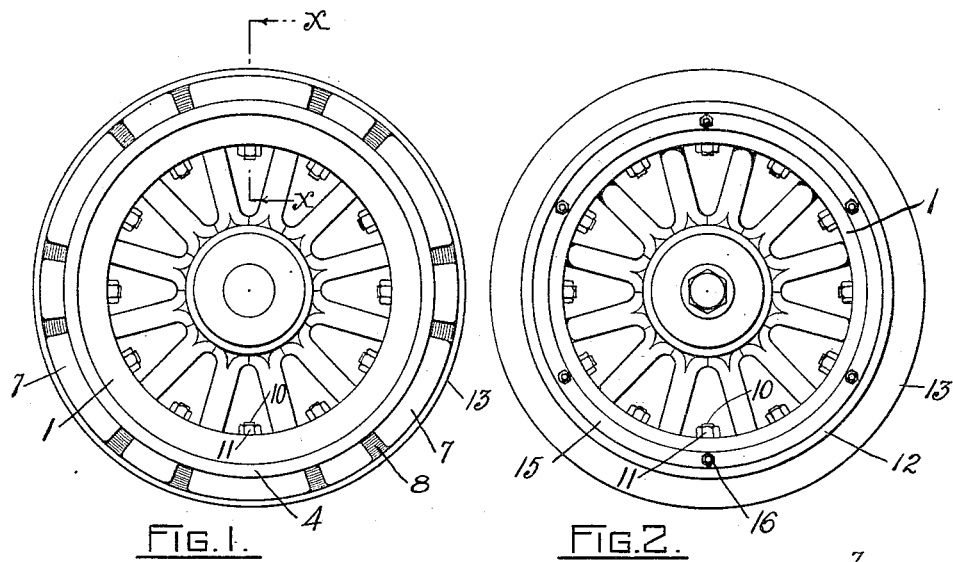
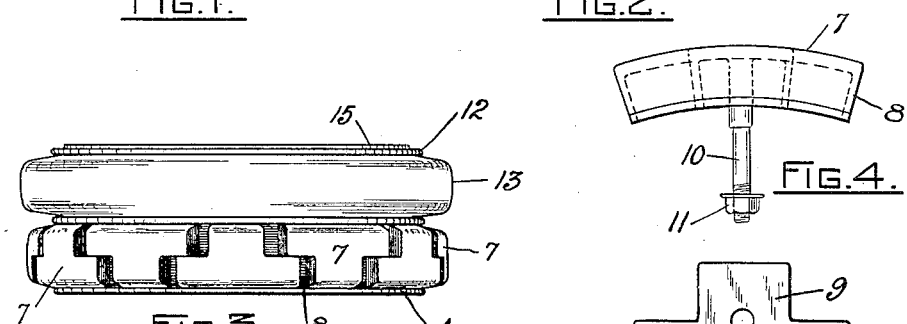
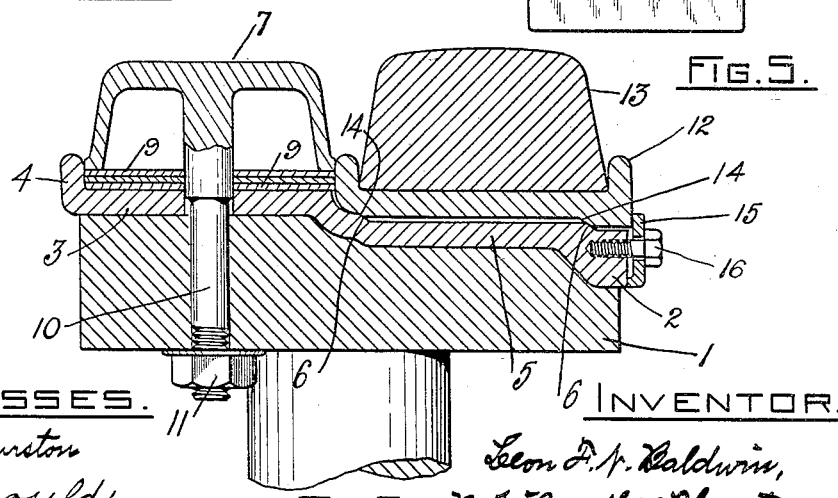
WITNESSES.
J. H. Thurston
F. L. Gould
INVENTOR.
Leon F. N. Baldwin,
By Wilmarth L. Thurston,
ATTORNEY.

UNITED STATES PATENT OFFICE.

LEON F. N. BALDWIN, OF CRANSTON, RHODE ISLAND.

VEHICLE-TIRE.

1,196,069.

Specification of Letters Patent.

Patented Aug. 29, 1916.

Application filed November 25, 1911. Serial No. 662,271.

*To all whom it may concern:*

Be it known that I, LEON F. N. BALDWIN, of the city of Cranston, county of Providence, and State of Rhode Island, have invented certain new and useful Improvements in Vehicle-Tires; and I do hereby declare the following specification, taken in connection with the accompanying drawings, forming a part of the same, to be a full, clear, and exact description thereof.

The invention relates to vehicle tires and more particularly to the so-called twin or double tires adapted for use on motor trucks which are designed to carry great weights.

The object of the invention is to provide a twin or double tire which will have the necessary amount of traction and which will sustain greater weights without injury and wear longer than the twin rubber tires now generally used.

To this end the invention consists primarily in making one of the twin tires of resilient material, such as rubber, and the other of said tires of non-resilient material or of material which has greater wearing qualities than rubber, such as steel, wood, or composition.

The invention further consists in making the non-resilient tire in blocks or sections which can be easily removed and replaced.

The invention further consists in providing means whereby the diameter of the non-resilient tire may be increased or decreased as desired.

The invention further consists in the arrangement and combination of parts hereinafter described and claimed, reference being had to the accompanying drawings, in which—

Figure 1 is an elevation of one side of a vehicle-wheel provided with my novel form of twin or double tire. Fig. 2 is an elevation of the opposite side of said wheel. Fig. 3 is a plan view of the tread of my novel twin tire. Fig. 4 is a side view on an enlarged scale of one of the sections of the non-resilient portion removed. Fig. 5 is a plan view on an enlarged scale of one of the removable shims. Fig. 6 is a sectional view on line *x—x* of Fig. 1 on an enlarged scale.

Referring to Fig. 6 of the drawings, 1 represents the felly of a vehicle wheel which is provided with a felly-band 2 comprising a raised portion 3 having a flange 4 upon the outside edge and a lower portion 5 having wedge-seats 6. Mounted upon said raised portion 3 is my novel non-resilient tire which is composed of a series of removable blocks or sections 7 preferably made of steel and T-shaped and mounted so as to overlap each other and with open spaces 8 between the same, as shown in Fig. 3. Removably mounted between the blocks 7 and the raised portion 3 of the felly-band 2 are a series of shims 9 corresponding in shape to the blocks 7. Said blocks 7 are preferably made hollow, and each is provided with an inwardly extending screw-threaded pin or bolt 10 which extends through holes formed in the shims 9, felly-band 2 and felly 1, and is provided with a nut 11 for clamping the blocks in position.

Removably mounted upon the lower portion 5 of the felly-band 2 is a channel-rim 12 in which is set a solid rubber tire 13, the face of which extends slightly beyond the face of the blocks 7. Said channel rim 12 is provided on its inner circumference with wedge-seats 14 which are adapted to engage the wedge-seats 6 upon the felly-band 2, and the rim 12 is clamped in position by the flange-ring 15 and bolts 16 which engage the felly-band 2, as shown in Fig. 6.

With the above construction it will be seen that as the face of the rubber tire 13 extends beyond the face of the blocks 7 said blocks 7 will not engage the road until the rubber tire 13 is crushed down sufficiently to give it the necessary traction and that when said blocks 7 do engage the road they sustain the major portion of the weight and thereby decrease the weight and strain and increase the life of the rubber tire. It will also be seen that upon the common dirt roads said blocks 7 will have great tractive and non-skid properties, and that when the rubber tire 13 becomes worn the blocks 7 may be lowered by removing one of the shims 9, thereby decreasing the circumference of the non-resilient tire. Should one of the blocks become damaged or worn more than the others it can be easily removed and replaced by a new one.

What I claim as my invention and desire to secure by Letters Patent is:

1. The combination, with a wheel-felly, of a felly-band, a series of metal blocks removably mounted on one side of said felly-band, and a rubber tire removably mounted upon the other side of said felly-band.

2. The combination with a wheel-felly of a resilient tire removably mounted thereon, a non-resilient tire removably mounted and radially adjustable thereon, and means arranged and adapted to radially adjust said non-resilient tire.

3. The combination, with a wheel-felly, of a felly-band, a series of shims removably mounted upon said felly-band, a series of metal blocks removably mounted upon said shims, means for securing said shims and blocks in position, and a rubber tire removably mounted upon said felly-band, the outer circumference of said rubber tire being greater than the outer circumference of said metal blocks.

4. The combination, with a wheel-felly, of a felly-band having a raised portion and a lower portion, a series of shims removably mounted upon said raised portion, a series of metal blocks removably mounted upon said shims, a radially extending bolt for holding said blocks in position, a channel rim having a rubber tire mounted therein and secured in place upon the lower portion of said felly-band by a removable flange-ring secured in position by a series of removable bolts.

LEON F. N. BALDWIN.

Witnesses:
W. H. THURSTON,
J. H. THURSTON.

Copies of this patent may be obtained for five cents each, by addressing the "Commissioner of Patents Washington, D. C."